Aug. 17, 1965     JEAN-PAUL BERNARD     3,200,906
STRAND BRAKE FOR AIRCRAFT ARRESTING GEAR
Filed Oct. 4, 1963

United States Patent Office 3,200,906
Patented Aug. 17, 1965

3,200,906
STRAND BRAKE FOR AIRCRAFT
ARRESTING GEAR
Jean-Paul Bernard, 3 Rue Bixio, Paris, France
Filed Oct. 4, 1963, Ser. No. 314,001
Claims priority, application France, Oct. 9, 1962,
911,701; Jan. 3, 1963, 920,320
2 Claims. (Cl. 188—65.1)

The present invention relates to devices for braking from the ground a landing aircraft having engaged a cable or net stretched across its path of travel.

It is shown that, in such devices, if use is made of a braking device including a large drum, the mass of said drum produces, when it is to be started into movement at high speed, a considerable resistance such that either the deceleration is too great or the link interposed between the aircraft and the braking device is destroyed.

The chief object of the present invention is to provide a device of the type described such that, in order to brake the aircraft, the initial inertia of the braking device is moderate whereas the braking device and the link between said braking device and the aircraft are adapted to support the temperature rise produced by the operation of the braking device without being deteriorated.

According to the present invention, the braking device comprises, on the ground, flat flexible strip means adapted to be bound at one end to said aircraft, most of the length of said strip means, starting from the other end thereof, being folded, for instance accordion plaited, so as to be gradually driven along by said aircraft, and friction brake means adapted to act directly on the portion of said strip means that is being unfolded by the pulling action of said aircraft, said means being so made and dimensioned as to dissipate the heat produced by braking without producing a dangerous temperature rise.

According to an embodiment of my invention said strip means consists of at least one strip of polyamide coated with an external layer consisting of an elastomer.

The external layer may be made of silicones mixed with metallic powders for instance an aluminum powder. Between this external layer and the synthetic material inner layer, there may be a sub-layer serving to insulate and to protect the fibres of synthetic material of the inner layer which are not capable of supporting high temperatures.

A good operation may for instance be obtained if, after passage through the braking device, the superficial temperature is 400° C., the temperature at the limit between the heat conducting outer layer and the insulating layer is 200° C. and the temperature of the textile yarns is 50° C. Later on, the temperatures will tend toward intermediate values but, owing to the cooling action of the air in which the strip is travelling, the textile yarns will never be at a temperature above 100° C.

Besides, cooling baths may be provided either downstream of the brake or between the brakes, if several of them are provided. Such a cooling bath may even be provided ahead of the brake.

My invention may be used for braking aircrafts of different weights, the kinetic energy of which ranges from some millions to some tens of millions of kilogramme-ters, the velocity averaging one hundred meters per second.

It is advantageous, in such a case, to have a great area of friction so as to evacuate the maximum amount of heat. For this purpose, it is advantageous to provide a plurality of strips, for instance six strips having a width of about 20 cms. and a resistance of about 20 tons.

The brake will be relatively long, averaging one meter, so that the strips remain therein sufficiently long to permit a good distribution of heat. Inside the brake, the strips are juxtaposed, with the interposition between them of plates carrying the friction linings. A plate pushed by hydraulic jacks serves to apply the desired tightening stress, the pressure being adjustable in accordance with the deceleration to be obtained. The strips upstream of the brake are accordion plaited.

I may also make the jaws of the brake in the form of plates of a metal which is a good conductor of heat, such as copper. Of course the amount of metal in said plates will be such that the heating that takes place does not lead to temperatures at which the strips are damaged. Advantageously, as above stated, superficial layers of said strips will be made of substances which are as good conductors of heat as possible.

A preferred embodiment of my invention will be hereinafter described with reference to the appended drawings, given merely by way of example, and in which.

Figure 1:
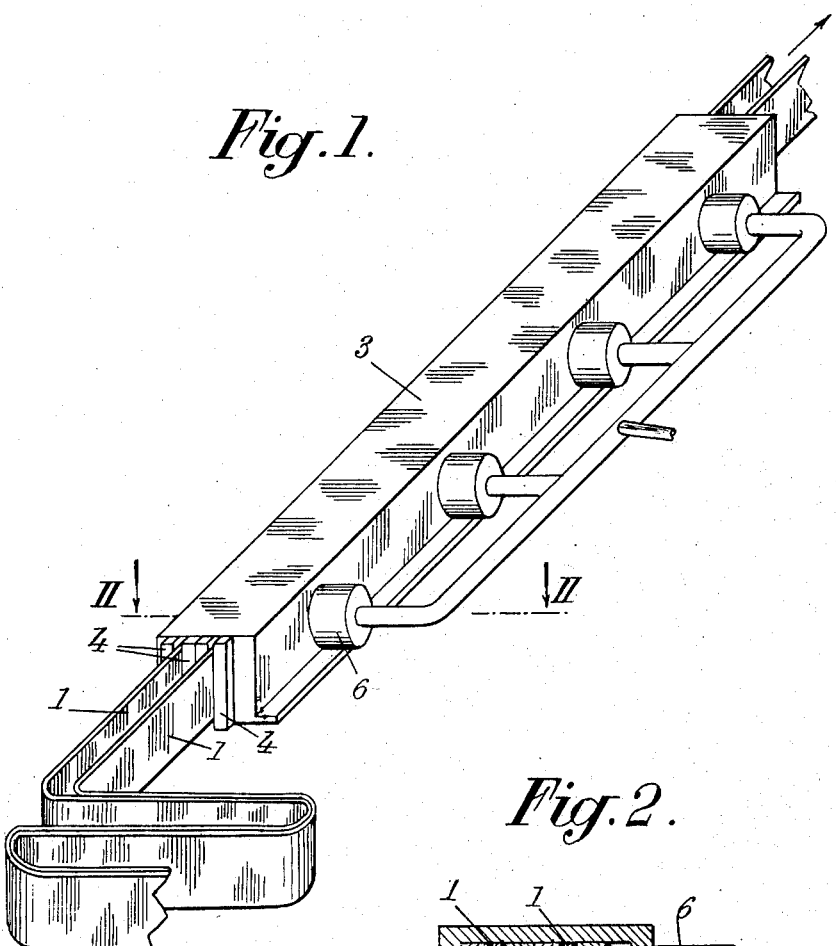
FIG. 1 is a perspective view of a device according to the present invention.
Figure 2:
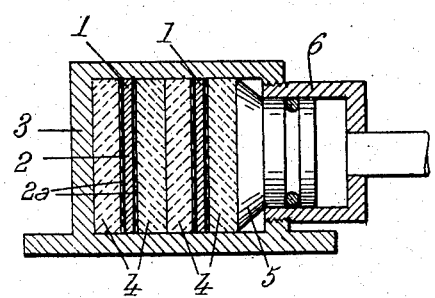
FIG. 2 is a sectional view on the line II—II of FIG. 1.

In this embodiment of my invention, strips 1 slip, in the body 3 of the brake, between copper plates 4. Said plates 4 are applied against the strips by a piece 5 which transmits the effort of the piston of jack 6.

It is not necessary to provide return means. It is sufficient to control the pressure sent to the jacks. The resiliency of strips 1 acts in the same manner as spring means.

As above stated, every strip 1 comprises a core or inner layer 2, made for instance of polyamide, an outer layer $2_a$, made for instance of silicones mixed with aluminum powder, a heat insulating coating being provided between these two layers 2 and $2_a$, all these parts being bonded together.

In a general manner, while I have in the above description disclosed what I deem to be a practical and efficient embodiment of my invention, it should be well understood that I do not wish to be limited thereto as there might be changes made in the arrangement, disposition and form of the parts without departing from the principle of my invention as comprehended within the scope of the appended claims.

What I claim is:

1. For use in an aircraft arresting gear of the type having a purchase cable extending transversely to the landing path to be engaged by an aircraft landing along said path, the combination of
    a flat flexible strip having one end thereof secured to said cable,
    friction brake means secured to the ground and arranged to engage said strip to brake the movement thereof upon pulling thereof by said cable,
    the portion of said flexible strip that is waiting to pass through said friction brake means resting edgewise on the ground and being zig-zag folded so that, during the operation of the device, only the length of said flexible strip portion that corresponds to the pulling of said strip by said cable is brought into movement, said flexible strip comprising a polyamide core and an elastomer layer on either side of said core.

2. For use in an aircraft arresting gear of the type having a purchase cable extending transversely to the landing path to be engaged by an aircraft landing along said path, the combination of a flat flexible strip having one end thereof secured to said cable, friction brake means secured to the ground and arranged to engage said strip to brake the movement thereof upon pulling thereof by said cable, the portion of said flexible strip that is waiting to pass through said friction brake means resting edgewise on the ground and being zig-zag folded so that, during the operation of the device, only the length of said flexible strip portion that corresponds to the pulling of said strip by said cable is brought into movement, said flexible strip comprising a polyamide core, external layers of a mixture of silicone and aluminum powder disposed on either side of said core and, between said core and said layers, a coating of a heat insulating material.

References Cited by the Examiner

UNITED STATES PATENTS

| | | | |
|---|---|---|---|
| 1,673,797 | 6/28 | Brown | 188—251 |
| 1,844,461 | 2/32 | Chase | 188—250 |
| 2,381,941 | 8/45 | Wellman et al. | 188—251 |
| 2,401,248 | 5/46 | Ingres | 188—65.2 |
| 2,483,655 | 10/49 | Schultz | 188—65.1 |
| 2,581,926 | 1/52 | Groten et al. | 188—250 |
| 2,619,442 | 11/52 | Shippee | 192—107 X |
| 2,702,770 | 2/55 | Steck | 188—251 |
| 2,762,586 | 9/56 | Van Zelm | 188—65.1 |
| 2,979,163 | 4/61 | Van Zelm et al. | 188—65.5 X |
| 2,986,238 | 5/61 | Eaton | 188—251 |

MILTON BUCHLER, *Primary Examiner.*

EUGENE G. BOTZ, ARTHUR L. LA POINT,
*Examiners.*